Patented Apr. 9, 1935

1,996,937

UNITED STATES PATENT OFFICE 1,996,937

PRODUCTION OF CHLORINATED RUBBER PRODUCTS

Wilfrid Devonshire Spencer, Wavertree, Liverpool, England, assignor to Imperial Chemical Industries Limited, a corporation of Great Britain No Drawing. Application June 1, 1933, Serial No. 673,930. In Great Britain June 2, 1932

12 Claims. (Cl. 260—1)

This invention relates to improvements in the production of chlorinated rubber products and particularly to the production of chlorinated rubber in a porous, spongy or fibrous condition.

It has previously been proposed to chlorinate a solution of rubber in a suitable solvent, such as carbon tetrachloride, and to separate from this solution, by evaporation in air, a solid product, suitable for the manufacture of films, varnishes, or plastic masses. A proposal has also been made to produce filaments of chlorinated rubber by precipitation in a suitable coagulating liquid.

According to the present invention, a porous, spongy or fibrous chlorinated rubber product is produced by evaporating a solution of chlorinated rubber by contact with an agitated liquid, which is immiscible with the solvent and with the solid product, and which is maintained at a temperature above the boiling point of the solvent under the conditions of working. Preferably the chlorinated rubber solution is introduced into the body of the agitated liquid at such a distance below the surface and at such a rate that substantially all of the solvent is removed from the chlorinated rubber before it has reached the surface of the liquid.

Thus a solution of chlorinated rubber in carbon tetrachloride may be introduced into a body of boiling water, which is violently agitated by blowing in steam, by means of a tube of 8 mm. diameter drawn out to a fine jet at the end, the jet being 25 cm. below the surface of the water when at rest and the solution being introduced at the rate of 25 c. c. per minute. The chlorinated rubber is obtained in fibrous form and is almost white in appearance. It possesses a very small bulk density and is particularly suitable for rapid resolution for the production of paints or the like.

Although it is possible to produce a satisfactory product by introducing the chlorinated rubber solution only a short distance below the surface of the water, it is better to have the inlet pipe extending a greater distance below the surface as by so doing it is obvious that an increased rate of production can be attained and the difficulties of control are lessened. The introduction of the solution may also be made by means of a number of inlet tubes into one body of water and by this means the amount of solution treated may be still further increased.

Somewhat inferior products are obtained if any chlorinated rubber reaches the surface of the heated liquid in the form of solution, as the chlorinated rubber tends to form hard lumps which are more difficult to dissolve in subsequent operations.

Example

A solution of chlorinated rubber in carbon tetrachloride was fed into about 100 litres of boiling water at the rate of 50 litres per hour, a small pump being used to force the solution through a 2.5 cm. pipe opening to the water at about 40–50 cm. below the surface. The water was thoroughly agitated and its temperature maintained by the injection of live steam. The carbon tetrachloride evoporated was passed along with steam to a condenser and thence to a separator in which the carbon tetrachloride was recovered for re-use. The chlorinated rubber was removed from the surface of the water, washed with clean water, and then dried in a current of warm air. About 5 kg. of product were obtained per hour.

The solution of chlorinated rubber may be obtained in any suitable manner, preferably by chlorinating directly a solution of rubber in a suitable solvent, e. g. carbon tetrachloride, until the solid which will be produced by evaporation contains about 65% $Cl_2$. Such a solution may be used without removal of excess chlorine or of the hydrogen chloride produced by the reaction. If these gases are present the free chlorine is removed along with the solvent and the hydrogen chloride dissolves in the water. If desired, a basic substance may be added to the water to neutralize the hydrochloric acid and to retain any small amount of chlorine which may be present.

After evaporation of the solvent, the chlorinated rubber product floats on the surface of the water and may be easily removed therefrom. It is then washed with water and dried at 90–100° C. or in a current of hot air. The evaporated solvent is recovered in any suitable manner from the vapours, e. g. by condensation and separation from the water which is simultaneously condensed.

Before evaporation of the solvent, an oil-soluble dye or a plasticizing agent may be incorporated with the solution of chlorinated rubber, in order to obtain a coloured final product or one uniformly incorporated with the plasticizing agent.

The products obtained according to this invention are in a porous, spongy or fibrous condition, suitable for many purposes and also have the advantage that they dissolve very rapidly in solvents for the production of varnishes, lacquers, waterproofing liquids, films or fibres.

I claim:

1. The process which comprises injecting a solution of chlorinated rubber in a volatile solvent below the surface of a body of hot agitated aqueous liquid which is inert to and immiscible with the solvent and the chlorinated rubber, the liquid being maintained at a temperature above the boiling point of the solvent, and the solution being injected into the liquid at such a rate that substantially all of the solvent is removed from the chlorinated rubber before the rubber reaches the surface of the liquid.

2. The process which comprises injecting a fine stream of a solution of chlorinated rubber in a volatile solvent below the surface of a body of hot agitated aqueous liquid which is inert to and immiscible with the solvent and the chlorinated rubber, the liquid being maintained at a temperature above the boiling point of the solvent, and the solution being injected into the liquid at such a rate that substantially all of the solvent is removed from the chlorinated rubber before the rubber reaches the surface of the liquid.

3. The process which comprises injecting a solution of chlorinated rubber in a volatile solvent below the surface of a body of agitated water maintained at a temperature above the boiling point of the solvent, the solution being injected into the water at such a rate that substantially all of the solvent is removed from the chlorinated rubber before the rubber reaches the surface of the water.

4. The process which comprises injecting a fine stream of a solution of chlorinated rubber in a volatile solvent below the surface of a body of agitated water maintained at a temperature above the boiling point of the solvent, the solution being injected into the water at such a rate that substantially all of the solvent is removed from the chlorinated rubber before the rubber reaches the surface of the water.

5. The process which comprises injecting a solution of chlorinated rubber in a volatile solvent below the surface of a body of water which is maintained in a state of agitation and heated to a temperature above the boiling point of the solvent under the conditions of working by passing steam into the body of water, the solution being injected into the water at such a rate that substantially all of the solvent is removed from the chlorinated rubber before the rubber reaches the surface of the water.

6. The process which comprises injecting a fine stream of a solution of chlorinated rubber in a volatile solvent below the surface of a body of water which is maintained in a state of agitation and heated to a temperature above the boiling point of the solvent under the conditions of working by passing steam into the body of water, the solution being injected into the water at such a rate that substantially all of the solvent is removed from the chlorinated rubber before the rubber reaches the surface of the water.

7. The process which comprises injecting a solution of chlorinated rubber in carbon tetrachloride below the surface of a body of agitated water maintained at a temperature above the boiling point of the solvent, the solution being injected into the water at such a rate that substantially all of the solvent is removed from the chlorinated rubber before the rubber reaches the surface of the water.

8. The process which comprises injecting a fine stream of a solution of chlorinated rubber in carbon tetrachloride below the surface of a body of agitated water maintained at a temperature above the boiling point of the solvent, the solution being injected into the water at such a rate that substantially all of the solvent is removed from the chlorinated rubber before the rubber reaches the surface of the water.

9. The process which comprises injecting a solution of chlorinated rubber in carbon tetrachloride below the surface of a body of water which is maintained in a state of agitation and heated to a temperature above the boiling point of the solvent under the conditions of working by passing steam into the body of water, the solution being injected into the water at such a rate that substantially all of the solvent is removed from the chlorinated rubber before the rubber reaches the surface of the water.

10. The process which comprises injecting a fine stream of a solution of chlorinated rubber in carbon tetrachloride below the surface of a body of water which is maintained in a state of agitation and heated to a temperature above the boiling point of the solvent under the conditions of working by passing steam into the body of water, the solution being injected into the water at such a rate that substantially all of the solvent is removed from the chlorinated rubber before the rubber reaches the surface of the water.

11. The process which comprises injecting a solution of chlorinated rubber in carbon tetrachloride below the surface of a body of boiling water which is maintained in a boiling and agitated condition by passing steam into it, the solution being injected into the water at such rate that substantially all of the carbon tetrachloride is removed from the chlorinated rubber before the rubber reaches the surface of the water.

12. The process which comprises injecting a fine stream of a solution of chlorinated rubber in carbon tetrachloride below the surface of a body of boiling water which is maintained in a boiling and agitated condition by passing steam into it, the solution being injected into the water at such rate that substantially all of the carbon tetrachloride is removed from the chlorinated rubber before the rubber reaches the surface of the water.

WILFRID D. SPENCER.